United States Patent
Kamikawa et al.

(10) Patent No.: US 6,801,752 B2
(45) Date of Patent: Oct. 5, 2004

(54) LEARNING SUPPORT METHOD AND LEARNING SUPPORT PROGRAM

(75) Inventors: Shunichi Kamikawa, Kawasaki (JP); Hiroshi Kuzumaki, Ota (JP); Keiko Chida, Ota (JP); Ryusuke Momose, Ota (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/259,469

(22) Filed: Sep. 30, 2002

(65) Prior Publication Data

US 2003/0180701 A1 Sep. 25, 2003

(30) Foreign Application Priority Data

Mar. 25, 2002 (JP) .................................. 2002-082475

(51) Int. Cl.[7] .............................................. G09B 7/00
(52) U.S. Cl. ...................... 434/362; 434/118; 434/350
(58) Field of Search ............................... 434/350, 362, 434/118

(56) References Cited

U.S. PATENT DOCUMENTS

| | | | | |
|---|---|---|---|---|
| 5,295,836 A | * | 3/1994 | Ryu et al. ................... 434/335 |
| 5,782,642 A | * | 7/1998 | Goren ..................... 434/307 R |
| 2002/0031756 A1 | * | 3/2002 | Holtz et al. .................. 434/362 |
| 2002/0086267 A1 | * | 7/2002 | Birkhoelzer et al. ......... 434/118 |
| 2003/0049592 A1 | * | 3/2003 | Park ........................... 434/322 |
| 2003/0207245 A1 | * | 11/2003 | Parker ........................ 434/350 |

* cited by examiner

Primary Examiner—Jessica Harrison
Assistant Examiner—Chanda L. Harris
(74) Attorney, Agent, or Firm—Staas & Halsey LLP

(57) ABSTRACT

When a client computer informs that a learner cannot understand the current learning material unit, a server computer specifies keywords linked with the current learning material unit that is attended by the learner as a first keyword set and specifies keywords linked with one of the learning material units that are already attended by the learner as a second keyword set. The server computer extracts keywords that are common between the first and second keyword sets as a selectable keyword set and transmits a list of keywords within the selectable keyword set to the client computer. When the client computer informs the keyword chosen by the learner, the server computer specifies the learning material unit that corresponds to the keyword chosen by the learner based on the keyword information and resends the specified learning material unit to the client computer.

17 Claims, 13 Drawing Sheets

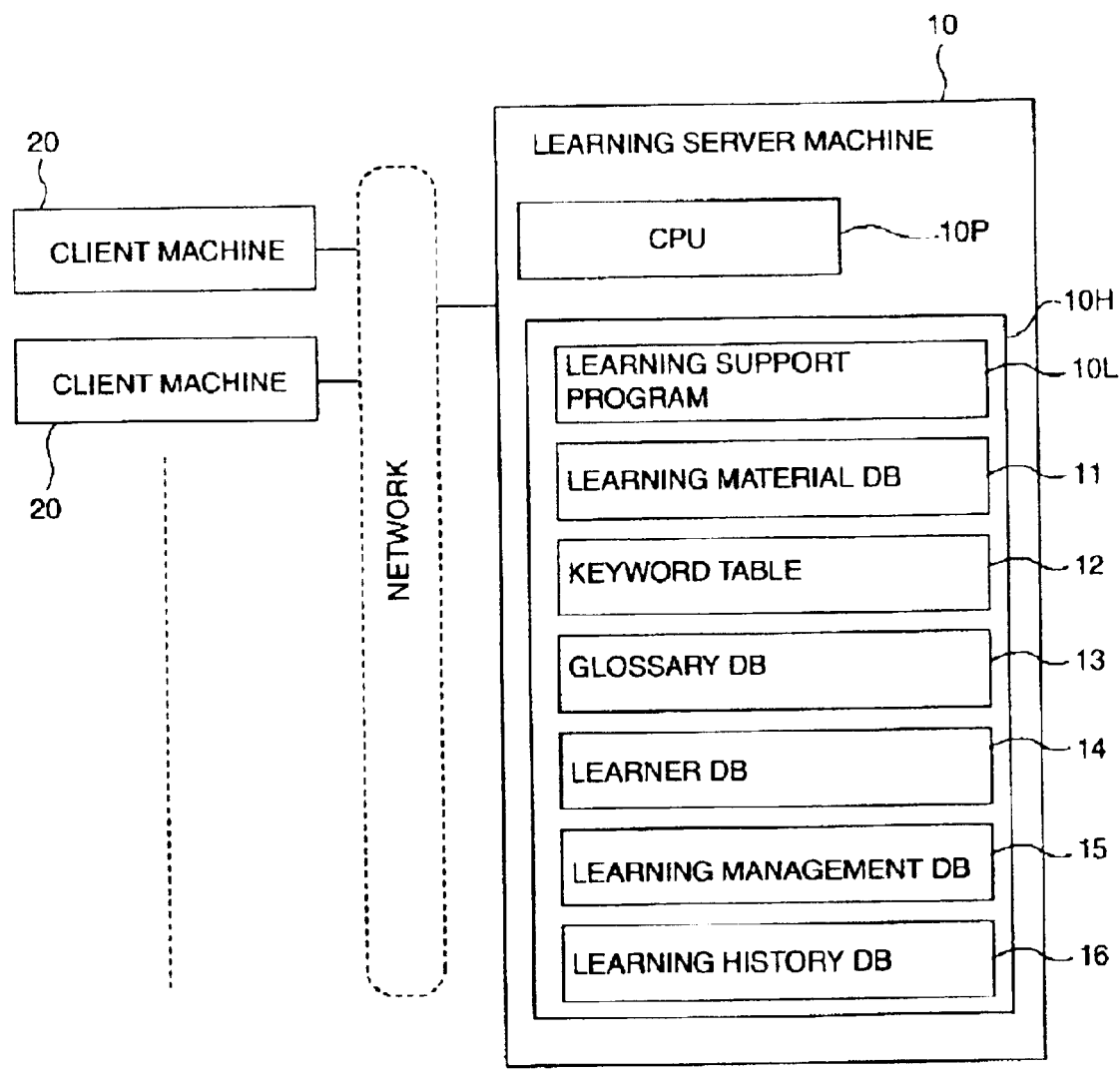

FIG. 2

<LEARNING MATERIAL DB 11>

| Learning Material Number | Learning Material Name | Chapter Number | Chapter Name | Section Number | Section Name | Item Number | Item Name | Learning Material Unit Number | Learning Material Entity |
|---|---|---|---|---|---|---|---|---|---|
| 2765 | Introduction To Network | 5 | TCP/IP | 3 | Relationship with Standard | 1 | Relationship with OSI 7th Layer Model | 17 | IP of TCP/IP corresponds to Network Layer of OSI 7th Model and TCP corresponds to Transport Layer.... |

FIG. 3

<KEYWORD TABLE 12>

| Learning Material Number | Learning Material Unit Number | Keyword | |
|---|---|---|---|
| | | Firstly Appeared Keyword | Already Appeared Keyword |
| 2765 | 15 | OSI reference model, Interface, Protocol, ISO/IEC, ... | |
| 2765 | 16 | Physical layer, Data link layer, Network layer, Transport layer, ... | Network architecture, LAN, WAN, ... |
| 2765 | 17 | TCP/IP, IP, ... | OSI reference model, Network layer, Transport layer, ISO/IEC, ... |
| 2765 | 18 | FTP, HTTP, SMTP, ... | OSI reference model, Connection management, Flow control, ... |
| | | | TCP/IP, IP, Data link layer, Network layer, Transport layer, Interface, Protocol, Communication control, OSI reference model, ... |

FIG. 4

<GLOSSARY DB 13>

| Keyword | Explanation |
|---------|-------------|
| TCP/IP  | TCP/IP is ............ |

FIG. 5

<LEARNER DB 14>

| Learner Number | Learner Name | Learning Material Number | Lecture Identifying number (Learner number-Learning material number-Suffix) |
|----------------|--------------|--------------------------|-----------------------------------------------------------------------------|
| 01-00367254    | Ii Learning  | 2765                     | 01-00367254-2765-00                                                         |

FIG. 6

<LEARNING MANAGEMENT DB 15>

| Lecture Identifying Number | Start Date | Deadline | End Date | Final Test Result | Learning Material Unit Number | Learned Flag |
|---|---|---|---|---|---|---|
| 01-00367254-2765-00 | 2001.12.01 | 2002.02.28 | | | 1 | 1 |
| | | | | | 2 | 1 |
| | | | | | 3 | 0 |
| | | | | | ... | |

FIG. 7

<LEARNING HISTORY DB 16>

| Lecture Identifying Number | Event Serial Number | Event ID | Event | Date and Time of Event | Learning Material Unit Number | Status |
|---|---|---|---|---|---|---|
| 01-00367254-2765-00 | 000013 | 0110 | "Not Understood" button was clicked | 2001.12.05 13:43:08 | 17 | .... |
| 01-00367254-2765-00 | 000021 | 0140 | "Understood" button was clicked | 2001.12.05 14:10:17 | 20 | .... |

FIG. 8

Chapter 5 Section 3 Item 1

IP of TCP/IP corresponds to the netword layer of the OSI sevin-layer model and TCP corresponds to the transport layer.....

| Understood | Next | Not Understood |

LEARNING SUPPORT METHOD AND LEARNING SUPPORT PROGRAM

BACKGROUND OF THE INVENTION

1. Field of the Invention

The present invention relates to a learning support method and a learning support program in so-called "e-Learning" system.

2. Prior Art

In late years the learning support system with a network and the World Wide Web technology has been developed. A learner (a student) is able to attend a lecture opened on the Web through a Web browser. Accordingly, a learner can study in a desired time at a desired place without limitations of time and place.

However, unlike a classroom education, in which a plurality of learners gather on a classroom to attend a lecture, each learner has to study individually in the learning support system.

In the classroom education, an instructor can realize intelligibility and degree of concentrations of the learners through their facial expressions, behavior and an atmosphere of the classroom. Therefore, the instructor can improve the intelligibility by changing a way of explanation and so on.

On the other hand, a service offerer of a conventional learning support system grasps the intelligibility of the learners indirectly through test results and questions from the learners. However, a frequency of test is limited. Further it is difficult to know intelligibility of each learner based on contents of the questions because a question is a voluntary action of a learner.

Since the learner who could not understand the contents of the lecture does not usually realize what point he or she could not understand, he or she cannot construct a question by analyzing an unknown portion. For example, a questioner who asks "what is corresponding to the session layer?" after the description "IP of TCP/IP corresponds to a network layer of OSI seven-layer model and TCP corresponds to a transport layer thereof" understands the contents of the description. On the contrary, a learner who does not know the OSI seven-layer model cannot ask questions about the description.

Further, in a classroom education, a learner does not exit from a classroom without saying a word even if he or she could not understand the contents of the lecture because he or she is attending the lecture with other learners in the classroom. However, in e-learning, a learner stops attending a lecture when he or she could not understand the contents of the lecture with or without frustration because he or she is not restrained in a classroom.

SUMMARY OF THE INVENTION

It is therefore an object of the present invention to provide an improved learning support method, which is capable of supporting a learner to learn and not to stop attending a lecture when a learner cannot understand the contents of the lecture.

For the above object, according to the present invention, there is provided a learning support method with a server computer that holds a plurality of learning material units and keyword information including keywords linked with the learning material units in a memory portion, the server computer being able to connect with a client computer of a learner. The method includes a keyword set specifying step for specifying keywords linked with the current learning material unit that is attended by the learner as a first keyword set and for specifying keywords linked with one of the learning material units that have already been attended by the learner as a second keyword set when the server computer informed from the client computer that a learner cannot understand the current learning material unit, a selectable keyword set extracting step for extracting keywords that are common between the first and second keyword sets as a selectable keyword set, and a keyword list transmitting step for transmitting a list of keywords within the selectable keyword set to the client computer.

With this method, when a learner who studies a learning material unit through a client computer that transmits the learning material and the learner could not understand the contents of the learning material, the learner receives the list of the keywords included in the current learning material unit. The learner can choose one keyword to require further information to the server computer.

When the client computer informs the server of the keyword chosen by the learner from among the keywords in the selectable keyword set, the server computer may specify the learning material unit that corresponds to the keyword chosen by the learner based on the keyword information to send the specified learning material unit to the client computer.

The second keyword set may include keywords that link with a latest learning material unit that has been recently attended and that was not understood by the learner. In such a case, the learning support method may further include a third keyword set specifying step for specifying keywords that link with a finished learning material unit other than the latest learning material unit from among those attended and not understood by the learner as a third keyword set when the server computer is informed from the client computer that a keyword required by the learner was not included in the selectable keyword set, a second selectable keyword set extracting step for extracting keywords that are common between the first and third keyword sets and not included in the selectable keyword set as a second selectable keyword set, and a second keyword list transmitting step for transmitting a list of keywords within the second selectable keyword set to the client computer.

It is desirable that the learning support method further includes a learning material unit specifying step for specifying the learning material unit that corresponds to the keyword chosen by the learner based on the keyword information when the server computer is informed by the client computer of the keyword chosen by the learner from among the keywords in the second selectable keyword set, and a learning material unit sending step for sending the specified learning material unit to the client computer.

Further, glossary information that includes explanations of the keywords may be installed in the memory portion. In such a case, the explanation information that corresponds to the keyword chosen by the learner based on the glossary information may be transmitted to the client computer when there was not a learning material unit corresponding to the keyword chosen by the learner.

The above described method is also available as a computer program executed on the server computer or the system consisting of the server computer and the program thereof.

DESCRIPTION OF THE ACCOMPANYING DRAWINGS

FIG. 1 is a block diagram showing the entire system of a learning support system of an embodiment according to the present invention;

FIG. 2 is a table showing data layout of a learning material DB;

FIG. 3 is a table showing data layout of a keyword table;

FIG. 4 is a table showing data layout of a glossary DB;

FIG. 5 is a table showing data layout of a learner DB;

FIG. 6 is a table showing data layout of a learning management DB;

FIG. 7 is a table showing data layout of a learning history DB;

FIG. 8 shows a Web page displaying a learning material;

DESCRIPTION OF THE PREFERRED EMBODIMENTS

Figure 9:
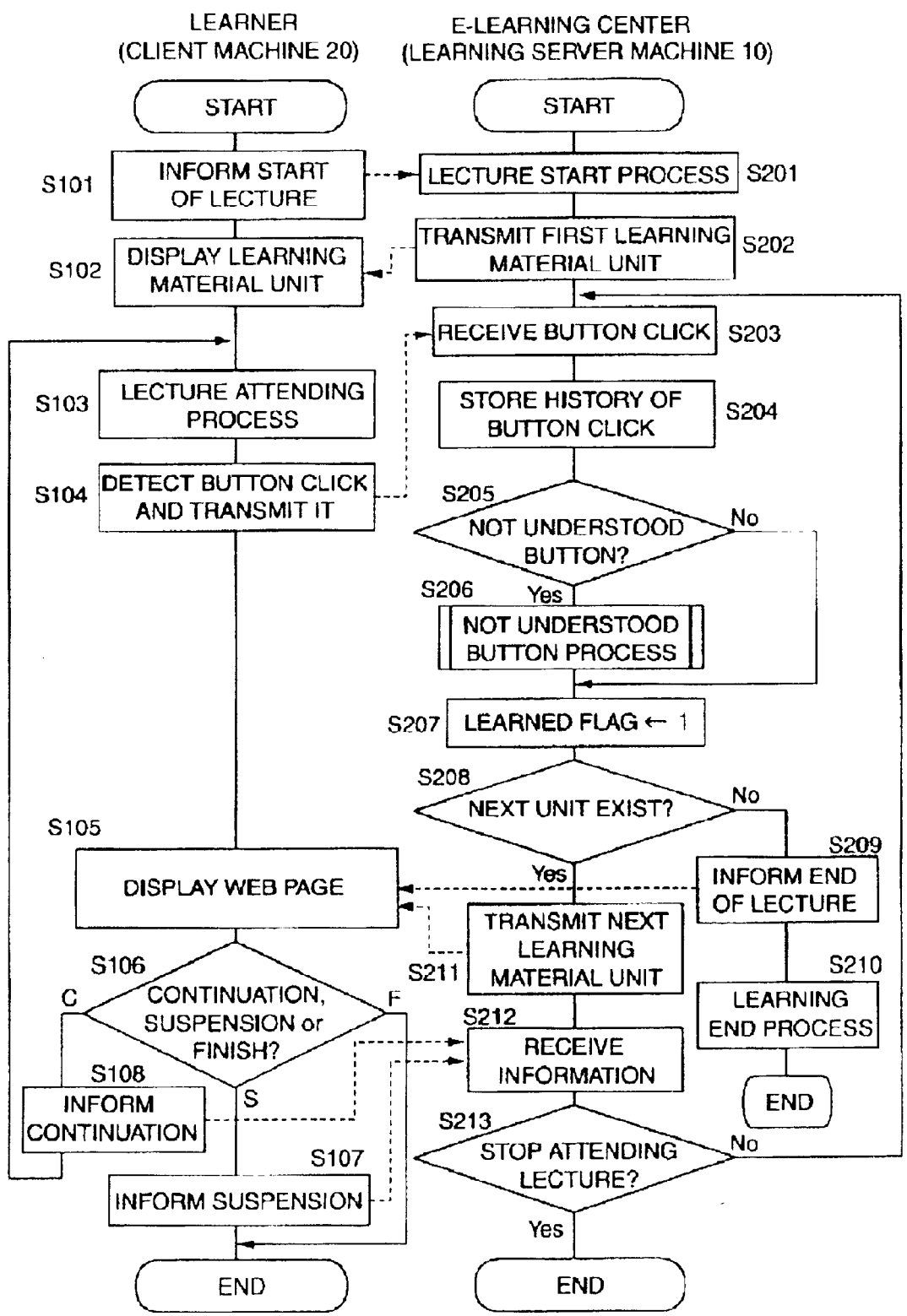
FIG. 9 is a flowchart showing the learning support method of the embodiment.

An embodiment of the present invention will be described with reference to the drawings. FIG. 1 is a block diagram of the entire system including a learning server machine 10 of the embodiment. The learning server machine 10 is a server computer located in an e-learning center and it can connect to a plurality of client machines 20 through a network such as the Internet. Further the learning server machine 10 is provided with a CPU 10P and a memory portion (storage) 10H having a hard disk and a memory that are connected to the CPU 10P. A learning support program 10L is installed in the memory portion 10H. The learning support program 10L includes a Web server program module, a server side program module and other program modules to execute processes described below with reference to FIGS. 9 through 12.

For example, the client machine 20 consists of a personal computer in which a Web browser program is installed. A learner can attend a lecture supplied by the learning server machine 10 by accessing to the learning server machine 10 from a client machine 20.

A leaning material supplied by the learning server machine 10 consists of a plurality of learning material units. The contents of a learning material are arranged in a hierarchical format of "chapter", "paragraph", "section" and "item". The learning material unit includes contents corresponding to the item. A learner who attends a lecture obtains a learning material corresponding to the lecture by the learning material unit in sequence to progress his or her learning. The learning materials are managed by the learning material DB 11 in the memory portion 10H of the learning server machine 10.

FIG. 2 shows a data layout of learning material DB 11. The learning material DB 11 contains a plurality of records that are created for respective learning material units, and each record includes fields of "Learning Material Number", "Learning Material Name", "Chapter Number", "Chapter Name", "Section Number", "Section Name", "Item Number", "Item Name", "Learning Material Unit Number" and "Learning Material Entity".

A learning material number, which is uniquely given for a learning material, is stored in the "Learning Material Number" field. A learning material name is stored in the "Learning Material Name" field. Number and name of a chapter in which the learning material unit corresponding to this record is contained are stored in the "Chapter Number" field and the "Chapter Name" field, respectively. Number and name of a section in which the learning material unit corresponding to this record is contained are stored in the "Section Number" field and the "Section Name" field, respectively. Number and name of an item corresponding to this record are stored in the "Item Number" field and the "Item Name" field, respectively. A learning material unit number, which is uniquely given for a learning material unit corresponding to this record, is stored in the "Learning Material Unit Number" field. The contents such as image data and text data of the learning material unit corresponding to this record are stored in the "Learning Material Entity" field.

Further, a keyword table 12 whose data layout is shown in FIG. 3 is stored in the memory portion 10H. The keyword table 12 contains a plurality of records that are identified by a combination of the "Learning Material Number" and the "Learning Material Unit Number". Each record of the keyword DB 12 includes a field of "Keyword" in which topics described in the corresponding learning material unit are stored. The keywords stored in the "Keyword" field are classified into firstly appeared keywords that are first appearance in the current learning material and already appeared keywords that are also described in the previous learning material unit of the current learning material. The keywords may be automatically extracted from the learning material entity or may be manually extracted by the person in charge.

Further, a glossary DB 13 whose data layout is shown in FIG. 4 is stored in the memory portion 10H. The glossary DB 13 contains a plurality of records and each record includes fields of "Keyword" and "Explanation".

Still further, a learner DB 14 shown in FIG. 5 is stored in the memory portion 10H. The learner DB 14 contains a plurality of records, and each record includes fields of "Learner Number", "Learner Name", "Learning Material Number" and "Lecture Identifying Number". A learner number that is uniquely given for a learner is stored in the "Learner Number" field. A learner name is stored in the "Learner Name" field. The number of the learning material of the learning course attended by the learner is stored in the "Learning Material Number" field. The lecture identifying number that is formed of the learner number, the learning material number and a suffix is stored in the "Lecture Identifying Number" field. The learner number and the learning material number are extracted from the lecture identifying number adversely. Namely, the learner and the learning material can be specified based on the lecture identifying number. Each record of the learner DB 14 uniquely corresponds to the lecture identifying number.

Yet further, a learning management DB 15 shown in FIG. 6 is stored in the memory portion 10H. The learning management DB 15 contains a plurality of records that are created for the respective lecture identifying numbers, and each record includes fields of "Lecture Identifying Number", "StartDate", "Deadline", "End Date", "Final Test Result", "Learning Material Unit Number" and "Learned Flag".

A date when the learner identified by the lecture identifying number started to attend the lecture with the learning material (learning course) of the corresponding learning material number is stored in the "Start Date" field. A deadline date set to the learning course is stored in the "Deadline" field. A default of the "End Date" is NULL. When the learner finishes the learning course, the finish date is stored in the "End Date" field. A default of the "Final Test Result" is NULL. When the learner takes a final test, a test result is stored in the "Final Test Result" field.

The learning material represented by the lecture identifying number consists of a plurality of learning material units as described above. One record of the learning management DB 15 contains a plurality of "Learning Materials Unit Number" fields and the "Learned Flag" fields corresponding to a plurality of learning material units. A unit number of the corresponding learning material unit is stored in the "Learning Material Unit Number" field. A default of the "Learned Flag" is "0". When the learner finishes the learning material unit, the value of the "Leaned Flag" field is replaced by "1".

Furthermore, a learning history DB 16 shown in FIG. 7 is stored in the memory portion 10H. The learning history DB 16 is a database to store a history of events detected during learning. Click of a button displayed on a Web page by a learner generates an event. When an event occurs while one learner is learning one learning material, the learning server machine 10 assigns a sequential event number to the event generated and creates a new record in the learning history DB 16 to store the content of the event with the sequential event number. The record is uniquely distinguished according to the lecture identifying number, which shows the learner number and the learning material number, and the sequential event number.

As shown in FIG. 8, three buttons are displayed on the learning Web page corresponding to one learning material unit. There are "Understood", "Next" and "Not Understood" buttons on the Web page.

A learner who understood the contents of the learning material unit (the learning material entity) clicks the "Understood" button on this Web page. On the other hand, a learner who could not understand the contents clicks the "Not Understood" button. When a learner cannot understand the contents of the learning material unit perfectly and the learner believes that he or she can understand the contents in later learning material units, the learner clicks the "Next" button.

As described above, the history of clicks is accumulated in the learning history DB 16 as a record corresponding to a combination of the lecture identifying number and the sequential event number. As shown in FIG. 7, each record of the learning history DB 16 includes fields of "Event ID", "Event", "Date and Time of Event", "Learning Material Unit Number" and "Status" in addition to the fields of "Lecture Identifying Number" and "Sequential Event Number".

An ID number given to the event corresponding to a type of the event and information showing the contents of the event occurred are stored in the "Event ID" and "Event" fields, respectively. Date and time when the event occurred are stored in the "Date and Time of Event" field. The number of the learning material unit that was learned by the learner at the time of the occurrence of the event is stored in the "Learning Material Unit Number" field. A present condition of the process executed in connection with the event is stored in the "Status" field.

A process when a learner attends a learning material unit will be described with reference to the flowchart of FIG. 9.

At first, a learner operates the client machine 20 to notify the learning server machine 10 that he or she wants to start attending one learning material (S101). Then the learning server machine 10 accepts attending the learning material (S201). The learning server machine 10 refers to the learning management DB 15 (FIG. 6) to extract the smallest learning material unit number out of the fields whose learned flag is "0" in the current record. The learning server machine 10 designates the learning material unit indicated by the extracted number in the learning material that is required by the learner as the first learning material unit.

Then the learning server machine 10 refers the learning material DB 11 to obtain the learning material entity of the record that corresponds to the first learning material unit. The learning server machine 10 creates a Web data that includes the learning material entity and then transmits it to the client machine 20 (S202).

Just then, the client machine 20 receives the Web data corresponding to the current learning material unit transmitted at step S202 and displays it as the Web page (S102). The learner studies with the learning material entity in the displayed Web page at step S103. When the learner finishes the learning, he or she clicks one of the "Understood" button, the "Next" button and the "Not Understood" button in accordance with his or her intelligibility.

The client machine 20 detects the event generated by the click of one of these buttons and transmits information representing the event (response information) to the learning server machine 10 (S104).

The learning server machine 10 receives the response information transmitted at step S104 and creates a record including the event of the response information (button click history) to add the learning history DB 16 (S204).

The learning server machine 10 causes the process to branch according to the response information received at step S204 (S205). When the response information represents that the event is a click of the "Not understood" button, the learning server machine 10 executes the process of step S206 before step S207. When the response information represents that the event is a click of the "Understood" button, the machine 10 directly executes step S207 without the step S206. The process of S206 will be described below with reference to FIGS. 10 and 11.

At step S207, the learning server machine 10 refers to the learning management DB 15 to extract the record that corresponds to the learning material attended by the learner and stores "1" in the "Learned Flag" field corresponding to the learning material unit number of the finished learning material unit he or she had recently finished. That is, the learned flag "0" of the "Learned Flag" field corresponding to the smallest learning material unit number is replaced by "1".

If there is no field whose "Learned flag" is "0" in the record corresponding to the learning material attended by the learner, the learning server machine 10 judges that the next learning material unit does not exist (S208, No), and it transmits a Web data representing end of the lecture to the client machine 20 (S209). Further, the learning server machine 10 executes the termination process of attending lecture by storing the current date in the "End Date" field of the corresponding record in the learning management DB15 (S210). The server-side process of the flowchart shown in FIG. 9 is finished.

On the other hand, when there is at least one field whose "Learned Flag" is "0" in the record corresponding to the learning material attended by the learner in the learning management DB 15, the learning server machine 10 judges that the next learning material unit exists (S208, Yes) and extracts the smallest learning material unit number out of the fields whose "Learned Flag" field is "0" in the current record. The learning server machine 10 designates the learning material unit indicated by the extracted number as the next learning material unit and refers the learning material DB 11 to obtain the learning material entity of the record that corresponds to the next learning material unit. The learning server machine 10 creates a Web data that includes the learning material entity and then transmits it to the client machine 20 (S211).

The client machine 20 receives the Web data transmitted at S209 or S211 corresponding to the current learning material unit and displays it as the Web page (S105). The learner can choose between a suspension of attending the lecture and a continuation thereof. Namely, the learner chooses the "Continuation" when he or she would like to continuously attend the learning material units later than the just-finished learning material unit. Otherwise, the learner chooses the "Suspension" when he or she would like to attend the lecture at a later time.

The client machine 20 causes the process to branch according to the choice among "Continuation", "Suspension" and "Finish" (S106). When the learner chooses the "Suspension" (S106, S), the client machine 20 transmits the information representing the suspension to the learning server machine 10 (S107) and finishes the process. When the learner chooses the "Continuation" (S106, C), the client machine 20 transmits the information representing the continuation to the learning server machine 10 (S108) and returns the process back to S103. When the Web page displayed at S105 represents the "Finish" of attending the lecture (S106, F), the client machine 20 finishes the process at the side of the client machine 20 shown in FIG. 9.

On the other hand, the learning server machine 10 receives the information transmitted at S107 or S108 (S212). When the received information represents the "Continuation" of attending the lecture (S213, No), the client machine 20 returns the process back to S203. When the received information represents the "Suspension" of attending the lecture (S213, Yes), the client machine 20 finishes the process at the side of the learning server machine 10 shown in FIG. 9.

Figure 10:
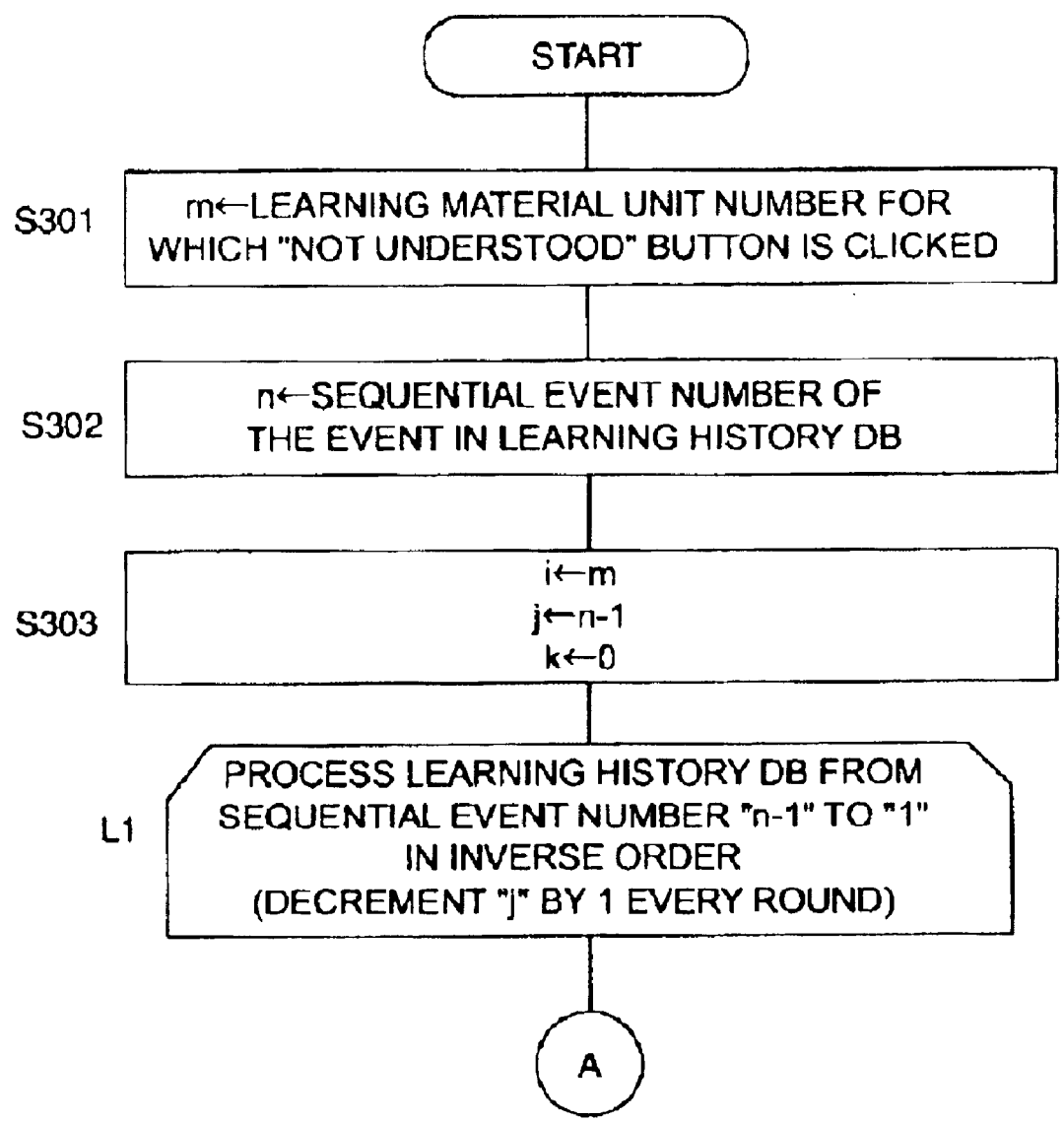
FIGS. 10 and 11 are flowcharts showing a detailed process of S206 in FIG. 9.

The process at S206 in FIG. 9 will be described in detail with reference to FIGS. 10 and 11. In this process, variables m, n, i, j, k and "Search End Flag" allocated in the memory portion 10H are used. The learning server machine 10 stores the learning material unit number, which corresponds to the learning material unit to which the learner clicked the "Not Understood" button, into the variable m (FIG. 10, S301) and stores the sequential event number of the record that corresponds to the click of the "Not Understood" button in the learning history DB 16 into the variable n (S302) The process is executed based on the record having a specific lecture identifying number that is identified by the learner who clicked the "Not Understood" button and the learning material unit that is now attended by the learner. The learning server machine 10 substitutes the value stored in the variable m into the variable i and substitutes the value obtained by subtracting 1 from the value stored in the variable n into the variable j. The variable k is initialized to zero (S303).

Next, the learning server machine 10 executes the process of a loop L1 (S304 to S317). In the loop L1, the learning server machine 10 processes each record in the learning history DB 16 from the record whose sequential event number is "n−1" to the record whose sequential event number is "1" in inverse order. That is, the process is executed based on the value of the variable j. The process starts from the initial value j=n−1 and decrements the value of the variable j by 1 every round of the loop.

In the loop L1, when the value of the variable j is zero (FIG. 11, S304, No), the process exits the loop L1 and goes to S318. If j>0 (S304, Yes), the learning server machine 10 refers the record of the learning history DB 16 whose sequential event number matches j (S305).

Next, when the learning material unit number of the record in the learning history DB 16 referred at S305 is equal to the value of the variable i (S306, Yes), the learning server machine 10 finishes the current round of the loop L1. On the other hand, when the learning material unit number of the record in the learning history DB 16 referred at S305 is not equal to the value of the variable i (S306, No), the learning server machine 10 causes the process to branch according to the kind of the event in the current record (S307). That is, when the event is not the click of the "Not Understood" button (S307, No), the learning server machine 10 finishes the current round of the loop L1. When the event is the click of the "Not Understood" button (S307, Yes), the learning server machine 10 substitutes the learning material unit number in the record of the learning history DB 16 whose sequential event number is equal to j into the variable i (S308). The learning server machine 10 increments the variable k by 1 (S309).

Next, the learning server machine 10 refers the keyword table 12 to find a keyword set $CKW_k$ (S310). Further, "k" of the $CKW_k$ is a suffix showing the variable k. This set $CKW_K$ is a common set between a set $KW_m$ that includes keywords stored in the "Keyword" field of the record of the keyword table 12 whose learning material unit number is equal to m and a set $KW_i$ that includes keywords stored in the "Keyword" field of the record whose learning material unit number is equal to i.

The process executed at the explained S310 has functions of a keyword set specifying step and a selectable keyword set extracting step. The set $KW_m$ is a first keyword set that contains keywords linked with the current learning material unit that is attended by the learner. The set $KW_i$ is a second keyword set that includes keywords linked with one of the learning material units that are already attended by said learner. The common set $CKW_k$ is a selectable keyword set that contains keywords being common between the first and second keyword sets.

When the set $CKW_k$ found at S310 is an empty set (S311, Yes), the learning server machine 10 finishes the current round of the loop L1. When the set $CKW_k$ found at S310 is not an empty set (S311, No), the learning server machine 10 causes the process to branch according to the value of the variable k (S312). That is, when the value of the variable k is equal to 1 (S312, Yes), the learning server machine 10 substitutes the set $CKW_k$ into a set UCKW of keywords to be presented for the learner (S313) and brings the process to S316. In this case, the set UCKW is the selectable keyword set that is common between the first and second keyword sets.

When the value of the variable k is not equal to 1 (S312, No), the learning server machine 10 creates the set UCKW of keywords to be presented for the learner by subtracting the sets $CKW_{k-}, CKW_{k-2}, \ldots, CKW_1$, which are found at S310 in previous rounds of the loop L1, from the set $CKW_k$ (S314). When the UCKW created at S314 is an empty set (S315, Yes), the learning server machine 10 finishes the current round of the loop L1. When the UCKW created at S314 is not an empty set (S315, No), the learning sever machine 10 brings the process to S316.

The process executed at the explained S314 has a function of a third keyword set specifying step and a second selectable keyword set extracting step. The sets $CKW_{k-1}$, $CKW_{k-2}, \ldots, CKW_1$ are common between the first keyword set and third keyword sets. The third keyword set contains keywords that link with the non-latest finished learning material unit from among those attended and not understood by the learner. After the second round of the loop L1, k is larger than "1". That is, the process at S314 is executed when the client computer informed that a keyword required by the learner was not included in the selectable keyword set. The UCKW created at S314 is a second selectable keyword set.

At S316, the learning server machine 10 creates a Web data representing the keywords included in the set UCKW found at S313 or S314 and transmits it to the client machine 20. The learning server machine 10 waits the response from the client machine 20. Interactive process between the learning server machine 10 and the client machine 20 corresponding to the process of S316 will be described in detail with reference to FIG. 12.

Figure 11:
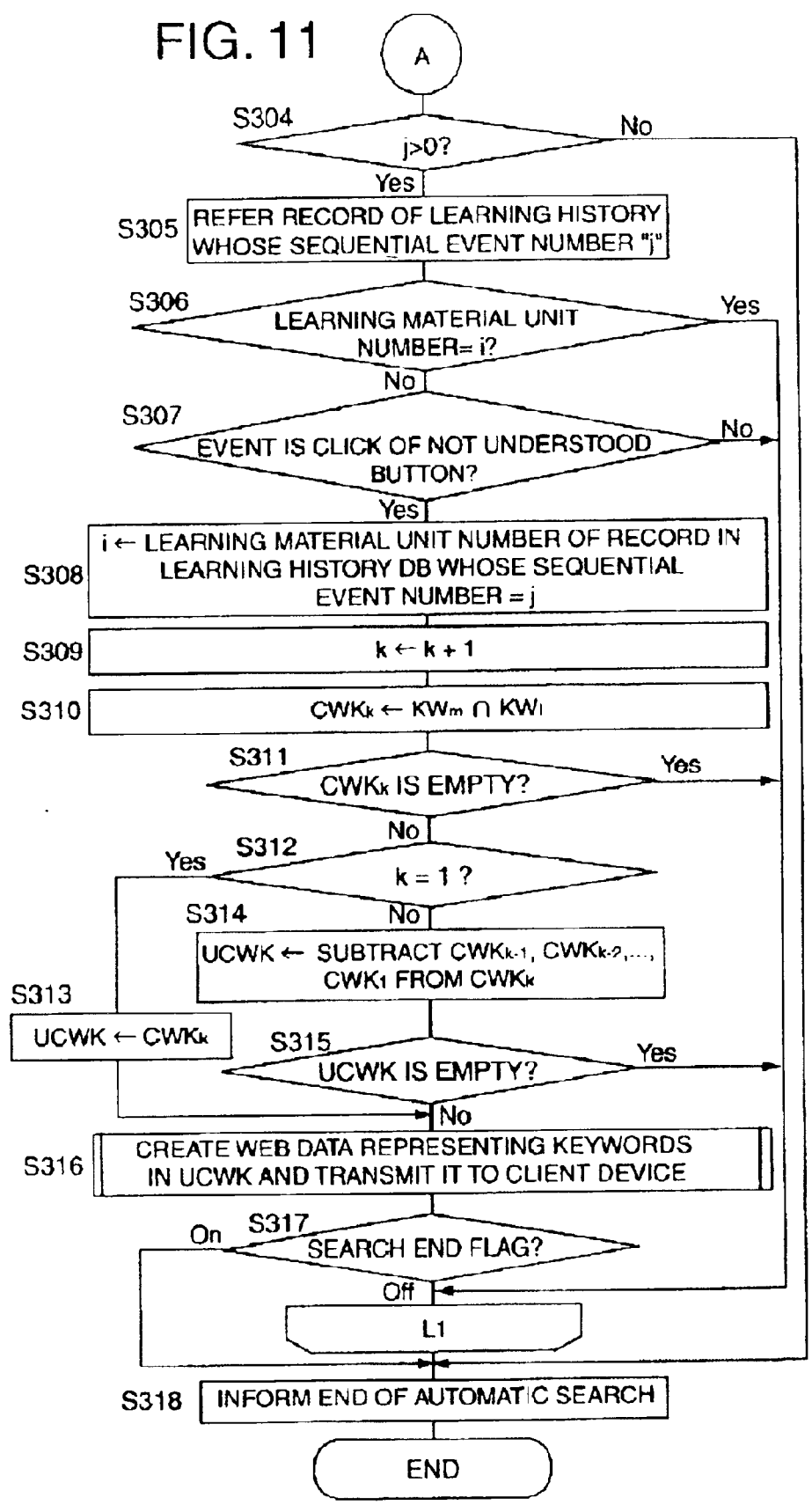
Figure 12:
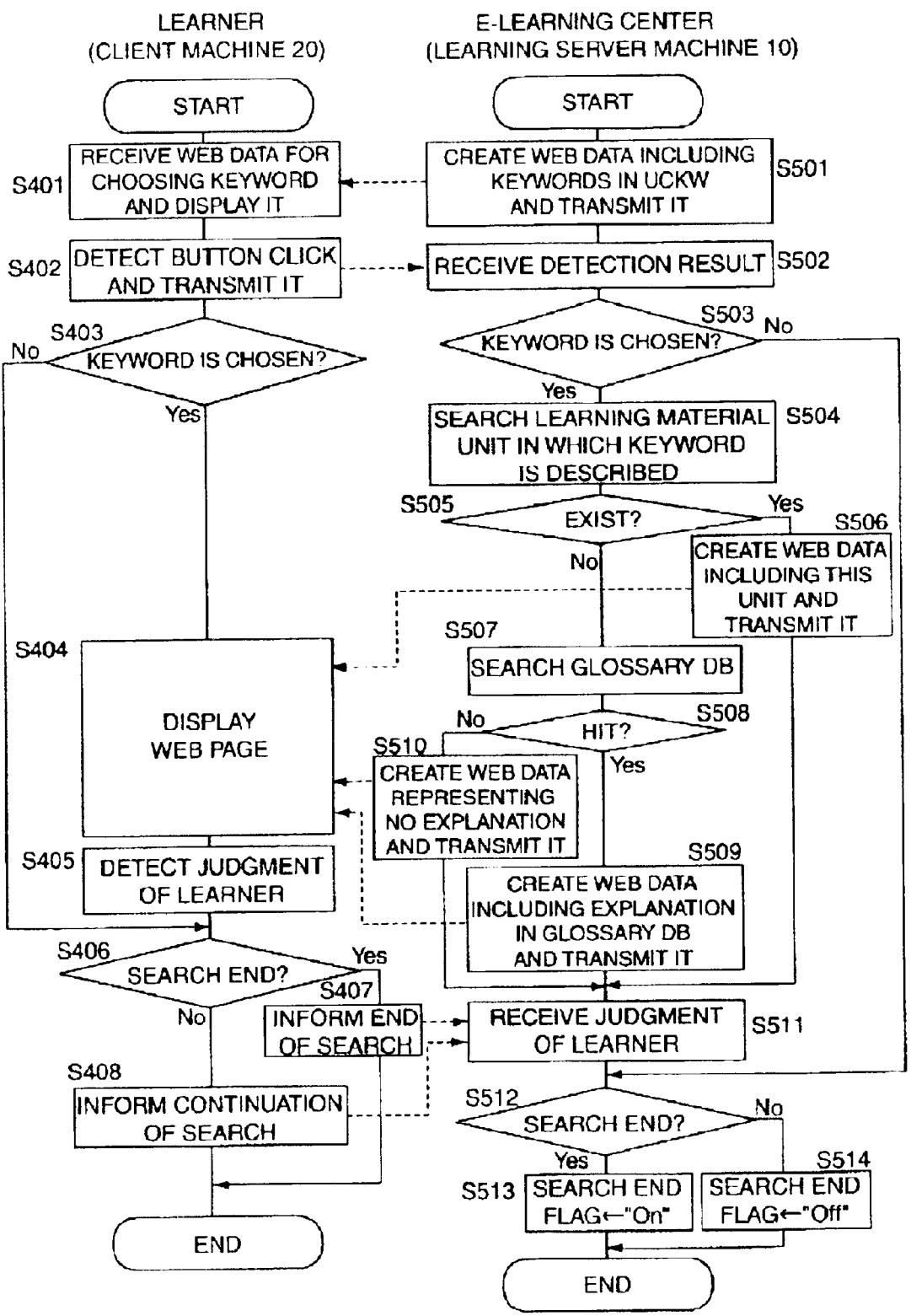
FIG. 12 is a flowchart showing a process of S316 in FIG. 11.

At S501 in FIG. 12, the learning server machine 10 creates a Web data representing the keywords included in the set UCKW found at S313 or S314 in FIG. 11 and transmits it to the client machine 20. Then, the client machine 20 receives the Web data transmitted at S501 and displays it as a Web page (S401).

Figure 13:
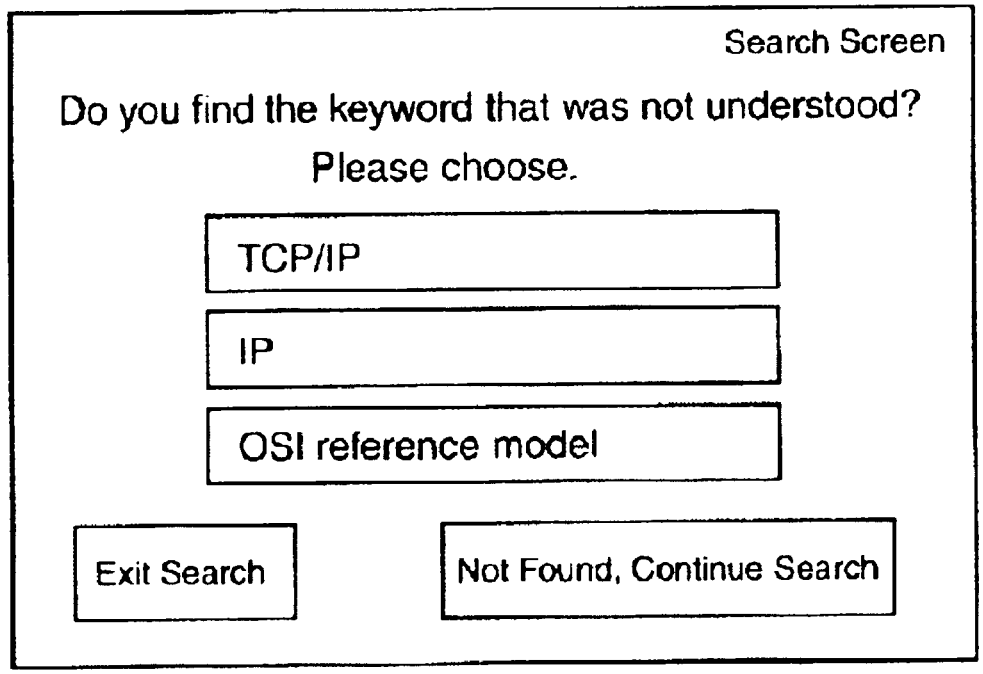
FIG. 13 shows one example of a Web page displaying a keyword selection.
Figure 14:
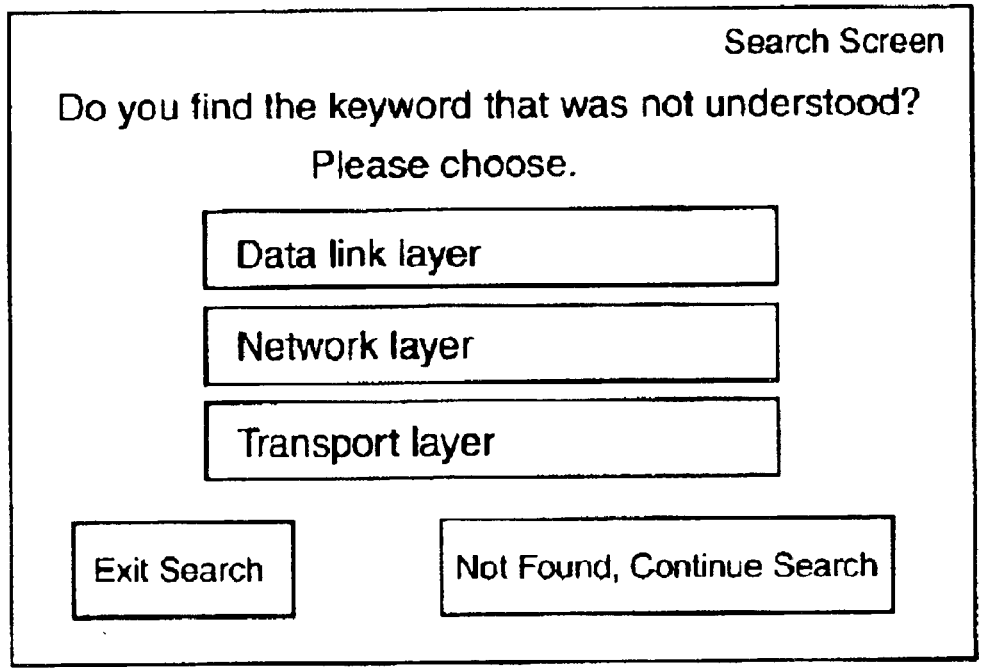
FIG. 14 shows another example of a Web page displaying the keyword selection.
Figure 15:
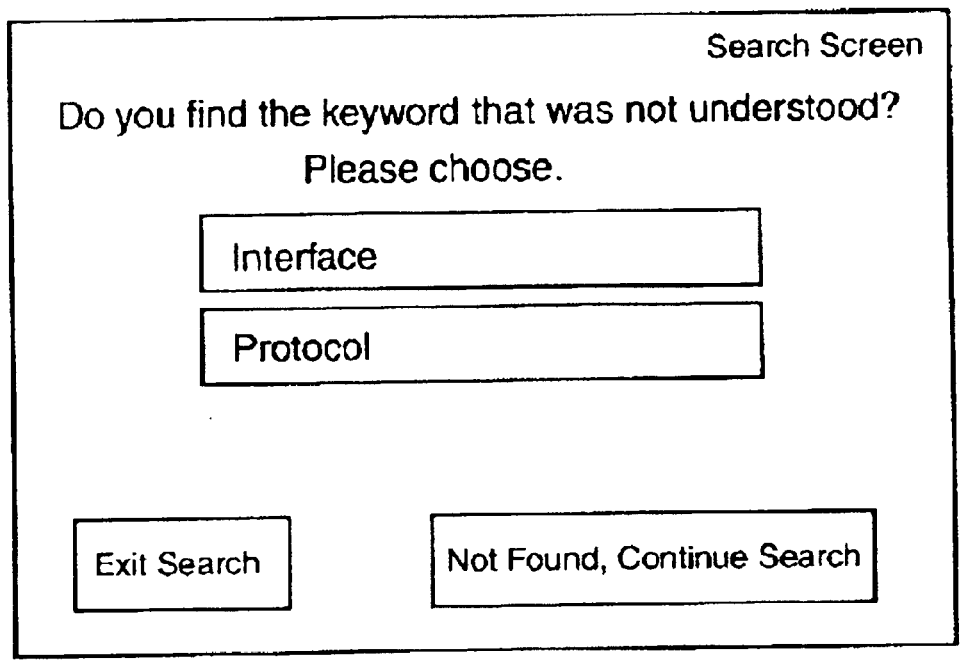
FIG. 15 shows still another example of aWebpage displaying the keyword selection.

FIGS. 13, 14 and 15 show examples of the Web pages. As shown in FIG. 13, the Web page displays buttons showing keywords, a "Exit Search" button and a "Not Found, Continue Search" button. When a learner who looks in the Web page finds the keyword about his or her unclear matter, he or she can click the button showing that keyword. If the keyword about his or her unclear matter is not displayed in the Web page, the learner can click the "Not Found, Continue Search" button to require showing other keywords, or the learner can click the "Exit Search" button to finish showing keywords. The client machine 20 detects the click of the button by the learner and transmits the detected result to the learning server machine 10 (S402).

Then, the learning server machine 10 receives the detected result transmitted at S402 (S502). If the detected result represents that the learner does not choose one of the keywords (S503, No), the learning server machine 10 brings the process to S512. On the other hand, when the detected result represents that the learner chooses one of the keywords (S503, Yes), the learning server machine 10 searches the keyword table 12 based on the chosen keyword (S504). Namely, the learning server machine 10 searches the keyword table 12 for the record whose firstly appeared keyword contains the keyword chosen by the learner among the records whose learning material unit number is smaller than m.

As a result of search at S504, when the learning material unit that matches the specified condition is found (S505, Yes), the learning server machine 10 creates a Web data including the found learning material unit and transmits it to the client machine 20 (S506). When the learning material unit that matches the specified condition is not found (S505, No), the learning server machine 10 searches the glossary DB 13 shown in FIG. 4 (S507). That is, the learning server machine 10 searches the glossary DB 13 for the record whose "Keyword" field matches the keyword chosen by the learner.

As a result of the search at S507, when the record that matches the specified condition is found (S508, Yes), the learning server machine 10 creates a Web data including the contents of the "Explanation" field and transmits it to the client machine 20 (S509). On the other hand, when the record that matches the specified condition is not found (S508, No), the learning server machine 10 creates a Web data representing that an explanation about the keyword chosen by the learner is not available and transmits it to the client machine 20 (S510).

Figure 16:
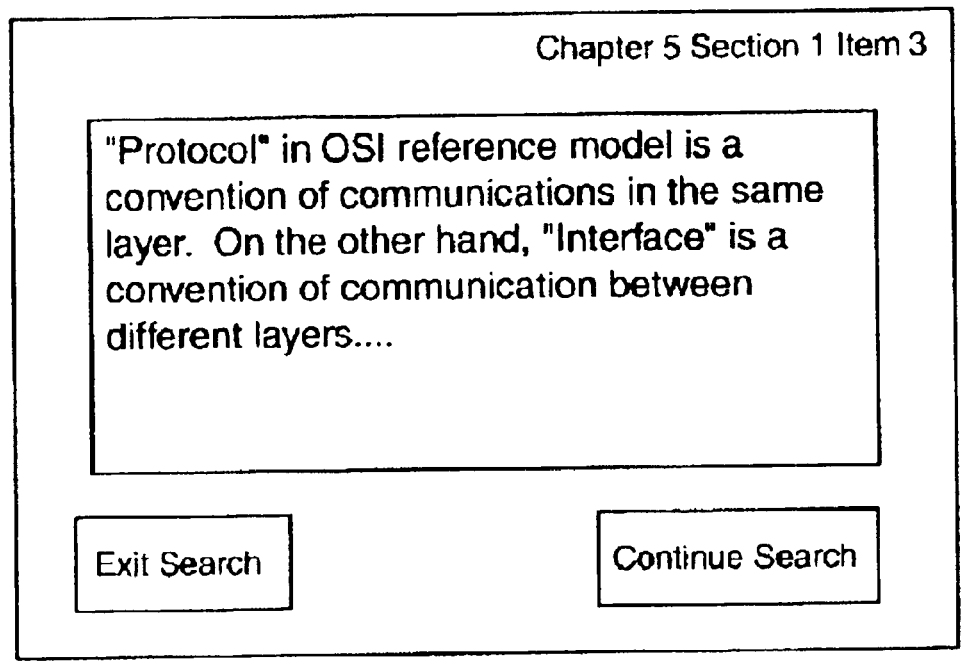
FIG. 16 shows a Web page displaying an explanation of a keyword.

The client machine 20 receives the Web data transmitted at S506, S509 or S510 and displays it as a Webpage (S404). This Web page includes a "Exit Search" button and a "Continue Search" button. For example, at S404, when the client machine 20 receives the Web data, which includes the learning material unit, created by the learning server machine 10 at S506, the Web page of the form shown in FIG. 16 is displayed on the client machine 20. If the learner would not like to choose a keyword anymore, he or she clicks the "Exit Search" button. If the learner would like to continue choosing a keyword, he or she should click the "Continue Search" button.

The client machine 20 detects the click of the button based on the judgment by the learner (S405). When the "Exit Search" button is clicked (S406, Yes), the client machine 20 transmits information representing to exit search to the learning server machine (S407). When the "Continue Search" button is clicked (S406, No), the client machine 20 transmits information representing to continue search to the learning server machine 10 (S408). In either case, the process at the side of the client machine in FIG. 12 is finished.

The learning server machine 10 receives the information transmitted at S407 or S408 as a response to the contents transmitted at S506, S509 or S510 (S511). When the information received at S511 represents to exit search (S512, Yes), the learning server machine 10 sets the "Search End Flag" at "On" (S513). When the information received at S511 represents to continue search (S512, No), the learning server machine 10 sets the "Search End Flag" at "Off" (S514). In either case, the process at the side of the learning server machine 10 in FIG. 12 is finished.

The end of the process in FIG. 12 means the end of the process at S316 in FIG. 11. After that, at S317 in FIG. 11, the learning server machine 10 causes the process to branch according to the "Search End Flag" set at S513 or S514 in FIG. 12. When the "Search End Flag" is "Off" (S317, Off), the learning server machine 10 finishes the current round of the loop L1. On the other hand, when the "Search End Flag" is "On" (S317, On), the learning server machine 10 exits the loop L1 and finishes the process of FIG. 11 after creating a Web data representing the end of the automatic search of a keyword and transmits it to the client machine 20 (S318). The client machine 20 displays the Web page transmitted at S318. The end of the process in FIG. 11 means the end of the process at S206 in FIG. 9.

According to the process described above, a learner can choose a keyword concerning the matter that could not be understood by himself or herself and he or she causes the explanation to appear on the client machine 20. For example, when the learner could not understand the contents of the learning material unit whose number is "18" and clicked the "Not Understood" button, the Web page shown in FIG. 13 is displayed on the client machine 20. The terms "TCP/IP", "IP" and "OSI reference model" displayed on the Web page of FIG. 13 are keywords included in the common set $CKW_1$ that is an intersection between the "Keyword" field of the record whose learning material unit number is "18" and the "Keyword" field of the record whose learning material unit number is "17" in the keyword table 12 (FIG. 3).

If the learner did not choose any keyword displayed in the Web page of FIG. 13 and clicked the "Not Found, Continue Search" button, the Web page shown in FIG. 14 is displayed on the client machine 20. The terms "Data Link Layer", "Network Layer" and "Transport Layer" displayed on the Web page of FIG. 14 are keywords included in the differential set that is obtained by subtracting the set $CKW_1$ from a common set $CKW_2$ that is an intersection between the "Keyword" field of the record whose learning material unit number is "18" and the "Keyword" field of the record whose learning material unit number is "16" in the keyword table 12 (FIG. 3) Therefore, the term "OSI reference model" is removed from the common set.

Further, if the learner did not choose any keyword displayed in the Web page of FIG. 14 and clicked the "Not Found, Continue Search" button, the Web page shown in FIG. 15 is displayed on the client machine 20. The terms "Interface" and "Protocol" displayed on the Web page of FIG. 15 are keywords included in the differential set that is obtained by subtracting the sets $CKW_1$ and $CKW_2$ from a common set $CKW_3$ that is an intersection between the "Keyword" field of the record whose learning material unit number is "18" and the "Keyword" field of the record whose learning material unit number is "15" in the keyword table 12 (FIG. 3). Therefore, the term "OSI reference model" is removed from the common set.

When the learner chooses the "Interface" among the keywords displayed on the Web page of FIG. 15, the learning server machine 10 extracts the record whose firstly appeared keyword contains keyword chosen by the learner in the keyword table 12 and identifies the learning material unit number thereof. Then the learning server machine 10 refers to the learning material DB 11 (FIG. 2) to obtain the learning material entity of the record whose learning material number matches the identified number and transmits the Web data including the learning material entity. Then the client machine 20 displays the Web page shown in FIG. 16 based on the transmitted Web data. Therefore, the learner can continue the lecture while supplementing the knowledge concerning the matter that could not be understood by the learner.

According to the present invention described above, since a learner who could not understand the contents of the lecture can look an explanation of the contents, the learner can continue learning with correct understanding.

What is claimed is:

1. A learning support method, comprising:
   storing in a server computer, which is in network communication with a client computer, a plurality of learning material units and keyword information including keywords linked with said learning material units;
   specifying the keywords linked with a current learning material unit that is attended by a learner at the client computer as a first keyword set and specifying the keywords linked with one of the learning material units that has already been attended by said learner as a second keyword set, when said server computer is informed from said client computer that the learner cannot understand said current learning material unit;
   extracting keywords that are common between said first and second keyword sets as a first selectable keyword set; and
   transmitting the extracted keywords within said first selectable keyword set to said client computer.

2. The learning support method according to claim 1, further comprising:
   specifying a learning material unit, based on said keyword information, that corresponds to a keyword chosen by said learner from the first selectable keyword set, when said server computer is informed from said client computer of the keyword chosen by said learner from among the keywords in said first selectable keyword set; and
   sending the specified learning material unit to said client computer.

3. The learning support method according to claim 1, wherein said second keyword set further comprises keywords that link with a latest finished learning material unit that has been recently attended by the learner and that was not understood by said learner, and further comprising:
   specifying keywords that link with a finished learning material unit other than the latest finished learning material unit from among those learning material units attended and not understood by said learner as a third keyword set, when said server computer is informed from said client computer that a keyword required by said learner was not included in said first selectable keyword set;
   extracting keywords that are common between said first and third keyword sets and not included in said first selectable keyword set as a second selectable keyword set; and
   transmitting the extracted keywords within said second selectable keyword set to said client computer.

4. The learning support method according to claim 3, further comprising:
   specifying a learning material unit, based on said keyword information, that corresponds to a keyword chosen by said learner from the second selectable keyword set, when said server computer is informed from said client computer of the keyword chosen by said learner from among the keywords in said second selectable keyword set; and
   sending the specified learning material unit to said client computer.

5. The learning support method according to claim 1, wherein the server computer further stores glossary information that includes explanations of said keywords linked with said learning material units, and further comprising:
   transmitting the explanation information that corresponds to a keyword chosen from the first selectable keyword set by said learner based on said glossary information to said client computer, when there is not a learning material unit corresponding to the keyword chosen by said learner.

6. A computer readable data storage storing a learning support program to control a server computer, which is in network communication with a client computer, according to a process comprising:
   storing a plurality of learning material units and keyword information including keywords linked with said learning material units;
   specifying the keywords linked with a current learning material unit that is attended by a learner at the client computer as a first keyword set and specifying the keywords linked with one of the learning material units that has already been attended by said learner as a second keyword set, when said server computer is informed from said client computer that the learner cannot understand said current learning material unit;

extracting keywords that are common between said first and second keyword sets as a first selectable keyword set; and transmitting the extracted keywords within said first selectable keyword set to said client computer.

7. The computer readable data storage according to claim 6, the process by the learning support program to control the server computer further comprises:

specifying a learning material unit, based on said keyword information, that corresponds to a keyword chosen by said learner from the first selectable keyword set, when said server computer is informed from said client computer of the keyword chosen by said learner from among the keywords in said first selectable keyword set; and sending the specified learning material unit to said client computer.

8. The computer readable data storage according to claim 6, wherein said second keyword set further comprises keywords that link with a latest finished learning material unit that has been recently attended by the learner and that was not understood by said learner, and the process by the learning support program to control the server computer further comprises:

specifying keywords that link with a finished learning material unit other than the latest finished learning material unit from among those learning material units attended and not understood by said learner as a third keyword set, when said server computer is informed from said client computer that a keyword required by said learner was not included in said first selectable keyword set;

extracting keywords that are common between said first and third keyword sets and not included in said first selectable keyword set as a second selectable keyword set; and transmitting the extracted keywords within said second selectable keyword set to said client computer.

9. The computer readable data storage according to claim 8, the process by the learning support program to control the server computer further comprises:

specifying a learning material unit, based on said keyword information, that corresponds to a keyword chosen by said learner from the second selectable keyword set, when said server computer is informed from said client computer of the keyword chosen by said learner from among the keywords in said second selectable keyword set; and sending the specified learning material unit to said client computer.

10. The computer readable data storage according to claim 6, wherein the server computer further stores glossary information that includes explanations of said keywords linked with said learning material units, and the process by the learning support program to control the server computer further comprises:

transmitting the explanation information that corresponds to a keyword chosen from the first selectable keyword set by said learner based on said glossary information to said client computer, when there is not a learning material unit corresponding to the keyword chosen by said learner.

11. A learning support system comprising:

a server computer comprising:
a data storage storing a plurality of learning material units and keyword information including keywords linked with said learning material units, said server computer in network communication with a client computer of a learner; and a programmed computer processor controlling the server computer according to a process comprising:

specifying the keywords linked with a current learning material unit that is attended by said learner at the client computer as a first keyword set and specifying the keywords linked with one of the learning material units that has already been attended by said learner as a second keyword set, when said server computer is informed from said client computer that the learner cannot understand said current learning material unit;

extracting keywords that are common between said first and second keyword sets as a first selectable keyword set; and transmitting the extracted keywords within said first selectable keyword set to said client computer.

12. The learning support system according to claim 11, said process by the programmed computer processor to control the server computer further comprises:

specifying a learning material unit, based on said keyword information, that corresponds to a keyword chosen by said learner from the first selectable keyword set, when said server computer is informed from said client computer of the keyword chosen by said learner from among the keywords in said first selectable keyword set; and sending the specified learning material unit to said client computer.

13. The learning support system according to claim 11, wherein said second keyword set further comprises keywords that link with a latest finished learning material unit that has been attended by the learner and that was not understood by said learner, and said process by the programmed computer processor to control the server computer further comprises:

specifying keywords that link with a finished learning material unit other than the latest finished learning material unit from among those learning material units attended and not understood by said learner as a third keyword set, when said server computer is informed from said client computer that a keyword required by said learner was not included in said first selectable keyword set;

extracting keywords that are common between said first and third keyword sets and not included in said first selectable keyword set as a second selectable keyword set; and transmitting the extracted keywords within said second selectable keyword set to said client computer.

14. The learning support system according to claim 13, said process by the programmed computer processor to control the server computer further comprises:

specifying a learning material unit, based on said keyword information, that corresponds to a keyword chosen by said learner from the second selectable keyword set, when said server computer is informed from said client computer of the keyword chosen by said learner from among the keywords in said second selectable keyword set; and sending the specified learning material unit to said client computer.

15. The learning support system according to claim 11, wherein the server computer further stores glossary information that includes explanations of said keywords linked with said learning material units, and the process by the programmed computer processor to control the server computer further comprises:

transmitting the explanation information that corresponds to a keyword chosen from the first selectable keyword set by said learner based on said glossary information to said client commuter, when there is not a learning material unit corresponding to the keyword chosen by said learner.

16. A computer data signal embodied in a carrier wave, comprising:

a code segment controlling a server computer, which is in communication with a client computer, according to a process comprising:

transmitting to the client computer a plurality of learning material units having keyword information of keywords linked with said learning material units, in response to a request by the client computer;

specifying the keywords linked with a current learning material unit that is attended by a learner at the client computer as a first keyword set and specifying the keywords linked with one of the learning material units that has already been attended by said learner as a second keyword set, when said server computer is informed from the client computer that the learner cannot understand said current learning material unit;

extracting keywords that are common between said first and second keyword sets to generate a first selectable keyword set; and transmitting the generated first selectable keyword set to the client computer.

17. The computer data signal of claim 16, wherein the second keyword set further comprises keywords that link with one of the learning material units that has been recently attended by the learner and that was not understood by the learner, and the process by the code segment controlling the server computer further comprises:

specifying keywords that link with a finished learning material unit other than a latest finished learning material unit from among those learning material units attended and not understood by the learner as a third keyword set, when the server computer is informed from the client computer that a keyword required by the learner was not included in the first selectable keyword set;

extracting keywords that are common between the first and third keyword sets and not included in the first selectable keyword set to generate a second selectable keyword set; and transmitting the generated second selectable keyword set to the client computer.

* * * * *

UNITED STATES PATENT AND TRADEMARK OFFICE
CERTIFICATE OF CORRECTION

PATENT NO.  : 6,801,752 B2
DATED       : October 5, 2004
INVENTOR(S) : Shunichi Kamikawa et al.

It is certified that error appears in the above-identified patent and that said Letters Patent is hereby corrected as shown below:

Column 15,
Line 8, change "commuter" to -- computer --.

Signed and Sealed this

Tenth Day of May, 2005

JON W. DUDAS
*Director of the United States Patent and Trademark Office*